Aug. 27, 1940.  W. GOODMAN  2,212,983
AIR CONDITIONING SYSTEM
Original Filed July 11, 1932
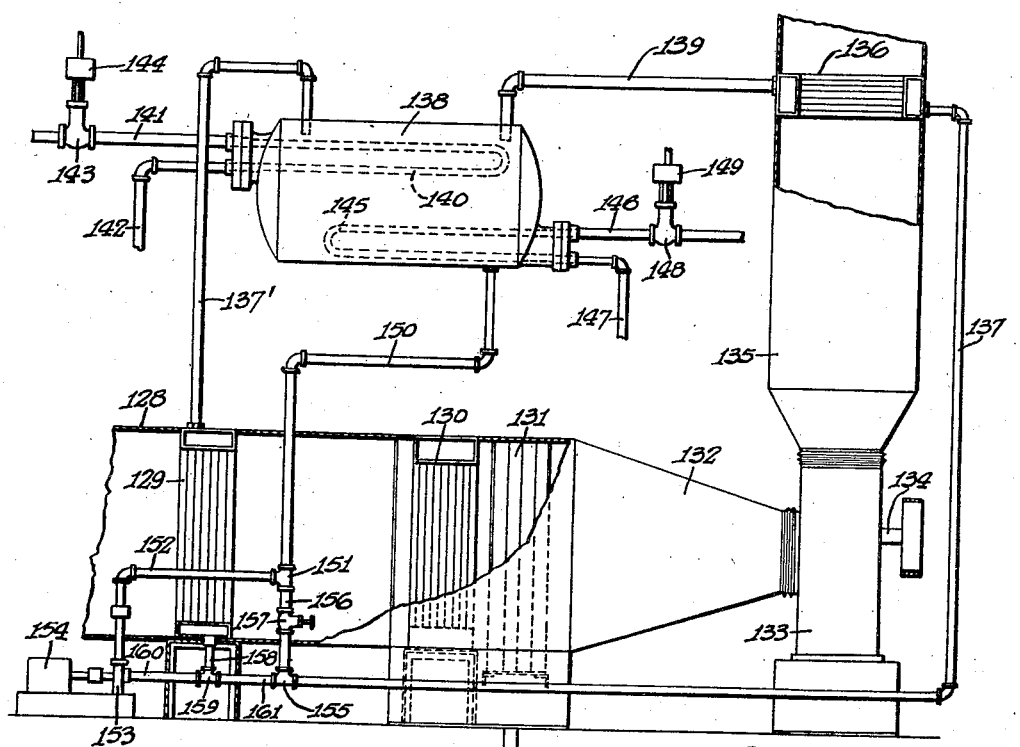
William Goodman
Inventor
Spencer Hardman & Fehr
Attorney Patented Aug. 27, 1940

2,212,983

UNITED STATES PATENT OFFICE 2,212,983

AIR CONDITIONING SYSTEM

William Goodman, La Crosse, Wis., assignor to General Motors Corporation, Dayton, Ohio, a corporation of Delaware Original application July 11, 1932, Serial No. 621,944. Renewed August 10, 1935. Divided and this application November 3, 1936, Serial No. 109,045

3 Claims. (Cl. 257—3)

This invention relates to air conditioning systems and more particularly to a system especially adapted for conditioning the air in a building or the like, in accordance with the requirements in the building.

This application is a division of my copending application for Letters Patent, Serial No. 621,944, filed July 11, 1932, renewed August 10, 1935, now Patent No. 2,072,166.

One of the objects of my invention is to provide an air conditioning system embodying a source of supply of conditioned air and to maintain dry bulb temperature and relative humidity in a building or the like pursuant to the requirements or conditions and notwithstanding varying sensible heat and moisture gains or losses in the building.

If no sensible heat is added to saturated air leaving a conditioner, its dry bulb and dew point temperatures are the same. As conditioned air enters a room, it is heated by the sensible heat liberated in the room and the air also absorbs moisture liberated in the room. Under extreme conditions, if the volume of low temperature saturated air supplied to a room to absorb all of the moisture being liberated is so great that the sensible heat liberated in the room is insufficient in quantity to heat the air supply to the desired dry bulb temperature, I have found that this dry bulb temperature gradually falls below that desired to be maintained. Under such conditions sensible heat must be added to the air supply in an amount sufficient to reduce the sensible heat absorbing capacity of the air so that the sensible heat liberated in the room merely heats the air to the desired temperature and this in no way impairs the moisture absorbing capacity of the air supply. Hence, another object of my invention is to provide an air conditioning system wherein sensible heat may be added to the air and to add this sensible heat without the necessity of increasing the capacity of the refrigerating device of the system over that which would be required if no sensible heat were added.

A still further object is to extract heat from air entering the air conditioner and to add this extracted heat to air discharged from the air conditioner as required.

Selected embodiments of the invention are illustrated in the accompanying drawing wherein The figure of the drawing is a partly diagrammatic view illustrating a system of supplying this conditioned air to a building.

In the arrangement illustrated an inlet conduit 128 is provided which may lead from a source of fresh air, a return air duct, or both. An evaporator or calefactory member 129 is provided and air flowing through the conduit 128 passes through this evaporator. A dehumidifier consisting of the refrigerating coil 130 for primary refrigerant separate from the secondary refrigerant and an eliminator 131 is arranged between the inlet conduit 128 and the outlet conduit 132 which leads to a fan housing 133 and a fan mounted on the shaft 134 draws air through the conduit 128 past the evaporator 129, refrigerating coil 130, and eliminator 131 and discharges the air into a distributing duct 135. In the distributing duct 135 is a condenser or calefactory member 136 having a return pipe 137 leading therefrom. Leading from the upper part of the evaporator 129 is a pipe 137' which leads into a tank 138. A pipe 139 leads from the tank to the condenser 136. In the tank 138 is a cold water coil 140 including an inlet pipe 141 and an outlet pipe 142. An automatic valve 143 is provided in the inlet pipe 141 and is actuated by an operating device 144 which may be controlled by a thermostat arranged in the room to which air is being supplied or in the supply duct or return air duct to be affected by the air temperature so that if the temperature of the air rises the valve 143 will open to permit water to flow through the coil 140 and when the temperature falls the valve 143 will tend to close. Also arranged in the tank 138 is a steam coil 145 including an inlet line 146 and an outlet line 147. A valve 148 is provided in the inlet line 146 and is actuated by an operating device 149 which in turn may be regulated in the same manner as the thermostatic device 144. A return pipe 150 leads from the tank 138 to a T-fitting 151. A pipe line 152 leads from the T-fitting 151 to a pump 153 operated by an electric motor 154 or the like. The return line 137 terminates in a T-fitting 155 and a pipe 156 extends between the T-fittings 151 and 155 and has a valve 157 therein. A pipe 158 leads from the bottom of the evaporator 149 to a T-fitting 159 and a pipe 160 extends between the pump 153 and the T-fitting 159. Another pipe 161 extends between the T-fittings 159 and 155.

The water coil 140 and the steam coil 145 are not used at the same time, the water coil being used during the summer when the heat flow is into the room or the like to which the conditioned air is supplied while the steam coil 145 is used during the winter when the heat flow is out of the room. When the water coil 140 is being used, the valve 157 is open and the pump 153 is not operated. The fluid or secondary refrigerant in liquid state substantially fills the evaporator 129 and seeks a corresponding level in the pipes 150 and 137'. As the warm air passes through the evaporator, the liquid is converted into a vapor state and passes into the pipe 137' and is discharged into the tank 138. From the tank 138 the vapor flows through the pipe 139 to the condenser 136 and the cooled air flowing through the duct 135 flows through the condenser 136 and takes up sensible heat and the vapor reverts to a liquid state and returns through the pipe 137. As the temperature rises, the control mechanism regulating the operating device 144 opens the valve 143 whereupon cold water flows through the coil 140. This cold water condenses vapor in the tank 138 which reverts to a liquid state and returns through pipe 150. The amount of cold water flowing through the coil 140 determines the quantity of vapor passing to the condenser 136 and by alternate opening and closing of the valve 143, as brought about by the operating device 144, a state of equilibrium is reached and this is maintained until there is a variation in the temperature or humidity of the air passing through the duct 135 or in the room or rooms to which this air is supplied. Thus by controlling the flow of water through the coil 140, the amount of sensible heat added to the air flowing through the duct 135 may be accurately regulated.

When the steam coil 145 is to be employed, the valve 157 is closed and the pump 153 acts to withdraw liquid from the pipes 137, 161, 158, and 160, and forces the liquid through the pipe 152, T-fitting 151 and pipe 150 into the tank 138. This liquid is heated by the steam or other heating medium flowing through the coil 145 and is converted into a vapor state and it passes through the pipe 137' to the evaporator 129 which in this instance acts as a condenser and through pipe 139 to the condenser 136. Air passing over the condenser 129 and condenser 136 takes up sensible heat and the vapor in these condensers reverts to a liquid state and is withdrawn by the pump 153 and forced back into the tank 138 to be reheated and vaporized. Hence it is apparent that the sensible heat may be added to the air to raise the temperature thereof so that the temperature in the room to which air is supplied by the duct 135 may be kept above atmospheric temperature.

It is to be understood that the air conditioners illustrated in the drawing may be used to supply air to a duct corresponding to the duct 14 shown in the aforementioned patent of which this is a division. And further, any one of the control arrangements shown in said patent in connection with the rooms 17 to 22, inclusive, may be used to control the air discharge from the duct 14. It is also to be understood that other analogous devices may be used to bring about the advantageous results accomplished by this invention.

Hence while I have illustrated and described a selected embodiment of my invention, it is to be understood that it is capable of variation and modification and I therefore do not wish to be limited to the precise details set forth but desire to avail myself of such changes and modifications as fall within the purview of the following claims.

I claim:

1. Air conditioning apparatus comprising a volatile refrigerating system having a first heat exchange element in thermal exchange relationship with the air to be conditioned, a second heat exchange element, a first refrigerant flow connection between said first and second heat exchange elements providing an unrestricted passage between said elements, a second refrigerant flow connection between said first heat exchange element and said second heat exchange element, means for supplying a heating medium in thermal exchange relationship to said second heat exchange element for vaporizing liquid refrigerant therein when heating of the air by said first heat exchange element is required and means for supplying a cooling medium in thermal exchange relationship with said second heat exchange element for condensing refrigerant vapor therein when cooling of the air by said first heat exchange element is desired, one of said heat exchange elements being arranged higher than the other whereby liquid refrigerant may flow by gravity from the higher of said elements to the lower of said elements, and means for elevating liquid refrigerant from the lower of said elements to the higher of said elements when refrigerant is being liquefied in the lower element and vaporized in the upper element.

2. Air conditioning apparatus comprising in combination, a first heat exchange element for either heating or cooling air to be conditioned by condensation or evaporation of a volatile refrigerant, a second heat exchange element, a first unrestricted refrigerant flow connection between said first and second heat exchange elements, a second refrigerant flow connection between said first and second heat exchange elements, one of said connections entering said first heat exchange element above the liquid level therein and the other of said connections entering said first heat exchange element below the liquid level therein, one of said connections entering said second heat exchange element above the liquid level therein, the other of said connections entering said second heat exchange element below the liquid level therein, means for supplying a heating medium in thermal exchange relationship to said second heat exchange element for vaporizing liquid refrigerant therein when heating of the air by said first heat exchange element is required, means for suppling a cooling medium in thermal exchange relationship with refrigerant vapor in said second heat exchange element for condensing refrigerant vapor therein when cooling of the air by said first heat exchange element is desired, and means for inducing circulation of liquid refrigerant from one of said heat exchange elements to the other of said heat exchange elements.

3. Air conditioning apparatus comprising in combination, a first heat exchange element for either heating or cooling air to be conditioned by condensation or evaporation of a volatile refrigerant, a second heat exchange element, a first refrigerant flow connection between said first and second heat exchange elements, a second refrigerant flow connection between said first and second heat exchange elements, one of said connections entering said first heat exchange element above the liquid level therein and the other of said connections entering said first heat exchange element below the liquid level therein, one of said connections entering said second heat exchange element above the liquid level therein, the other of said connections entering said second heat exchange element below the liquid level therein, means for supplying a heating medium in thermal exchange relationship to said second heat exchange element for vaporizing liquid refrigerant therein when heating of the air by said first heat exchange element is required, means for supplying a cooling medium in thermal exchange relationship with refrigerant vapor in said second heat exchange element for condensing refrigerant vapor therein when cooling of the air by said first heat exchange element is desired, means for inducing circulation of liquid refrigerant from one of said heat exchange elements to the other of said heat exchange elements, means responsive to the temperature of air for controlling the supply of cooling medium to said second heat exchange element when cooling is required, and means responsive to the temperature of air for controlling the supply of heating medium to said second heat exchange element when heating is required.

WILLIAM GOODMAN.